(12) United States Patent
Frey et al.

(10) Patent No.: US 8,645,667 B2
(45) Date of Patent: *Feb. 4, 2014

(54) OPERATING SYSTEM MANAGEMENT OF ADDRESS-TRANSLATION-RELATED DATA STRUCTURES AND HARDWARE LOOKASIDES

(75) Inventors: Bradly George Frey, Austin, TX (US);
Michal Ostrowski, Austin, TX (US);
Andrew Henry Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,898

(22) Filed: Jul. 16, 2012

(65) Prior Publication Data

US 2012/0284465 A1 Nov. 8, 2012

Related U.S. Application Data

(63) Continuation of application No. 12/983,989, filed on Jan. 4, 2011.

(51) Int. Cl.
*G06F 12/00* (2006.01)
(52) U.S. Cl.
USPC .................. 711/207; 711/206; 711/E12.061

(58) Field of Classification Search
USPC .............. 711/154, 206, 6, E12.001, E12.078, 711/207, E12.061
See application file for complete search history.

(56) References Cited

U.S. PATENT DOCUMENTS

| 6,877,158 | B1 | 4/2005 | Arndt ............................ 718/104 |
| 6,898,677 | B2 | 5/2005 | Arimilli et al. ................ 711/148 |
| 2006/0253682 | A1 | 11/2006 | Armstrong et al. ........... 711/173 |
| 2007/0016755 | A1 | 1/2007 | Pratt .............................. 711/207 |
| 2007/0113227 | A1 | 5/2007 | Oney et al. ......................... 718/1 |
| 2009/0217098 | A1* | 8/2009 | Farrell et al. .................... 714/37 |

\* cited by examiner

*Primary Examiner* — Mardochee Chery
(74) *Attorney, Agent, or Firm* — VanLeeuwen & VanLeeuwen; Matthew W. Baca

(57) ABSTRACT

An approach is provided in a hypervised computer system where a page table request is at an operating system running in the hypervised computer system. The operating system determines whether the page table request requires the hypervisor to process. If the determination reveals that the page table request requires the hypervisor, then the hypervisor is used to handle the request. However, if the determination reveals that the page table request does not require the hypervisor, then an indicator included in a page table entry corresponding to the request is read to determine if the page table entry is controlled by the operating system or the hypervisor. The operating system is able to update the page table entry if the indicator identifies the page table entry as being operating system controlled.

8 Claims, 5 Drawing Sheets

OPERATING SYSTEM MANAGEMENT OF ADDRESS-TRANSLATION-RELATED DATA STRUCTURES AND HARDWARE LOOKASIDES

RELATED APPLICATION

This application is a continuation of U.S. application Ser. No. 12/983,989, filed Jan. 4, 2011, titled "Operating System Management of Address-Translation-Related Data Structures and Hardware Lookasides," and having the same inventors as the above-referenced application.

TECHNICAL FIELD

The present invention allows an operating system to manage address data structures rather than a hypervisor.

BACKGROUND

Traditionally in hypervised systems, an operating system manages storage (e.g. maintains the page table, etc.) using service calls to the hypervisor. In environments which set up and tear down huge numbers of short-lived applications (e.g. some types of web serving applications, etc.), the overhead of hypervisor intervention is costly in terms of performance. One approach used by some architectures (e.g. IA32, etc.) has been to create a second level of translation so that the operating system can maintain the first level of page translation, while the hypervisor continues to maintain the actual mapping to real address space. This approach can be costly both in terms of hardware lookaside resources and storage footprint for the tables (and resulting cache pressure). Traditionally, the hypervisor prevents the OS from accessing page tables using conventional storage protection mechanisms that are part of most memory management architectures.

SUMMARY

An approach is provided in a hypervised computer system where a page table request is at an operating system running in the hypervised computer system. The operating system determines whether the page table request requires the hypervisor to process. If the determination reveals that the page table request requires the hypervisor, then the hypervisor is used to handle the request. However, if the determination reveals that the page table request does not require the hypervisor, then an indicator included in a page table entry corresponding to the request is read to determine if the page table entry is controlled by the operating system or the hypervisor. The operating system is able to update the page table entry if the indicator identifies the page table entry as being operating system controlled, otherwise the update is handled by the hypervisor.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

Figure 1:
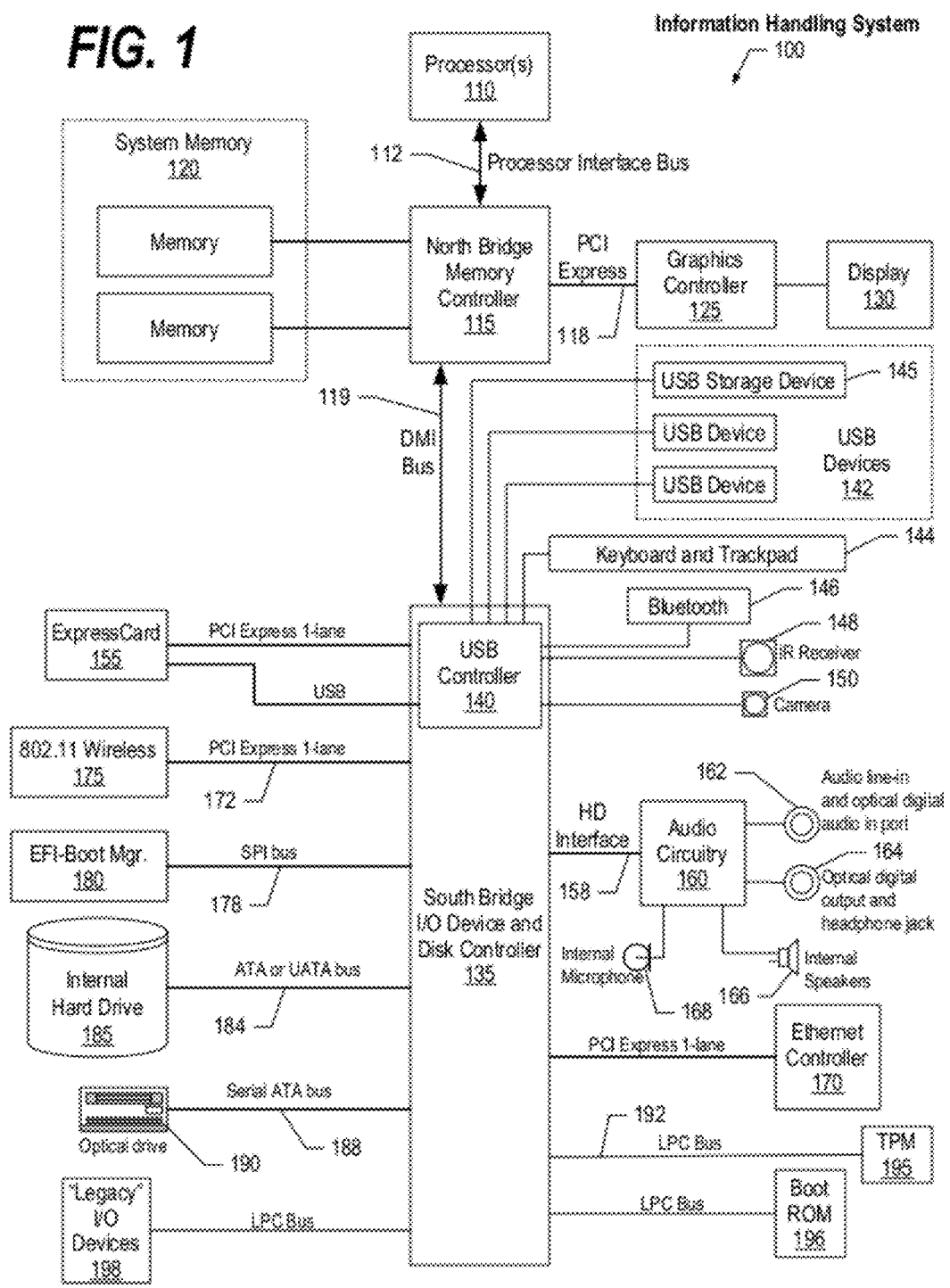
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
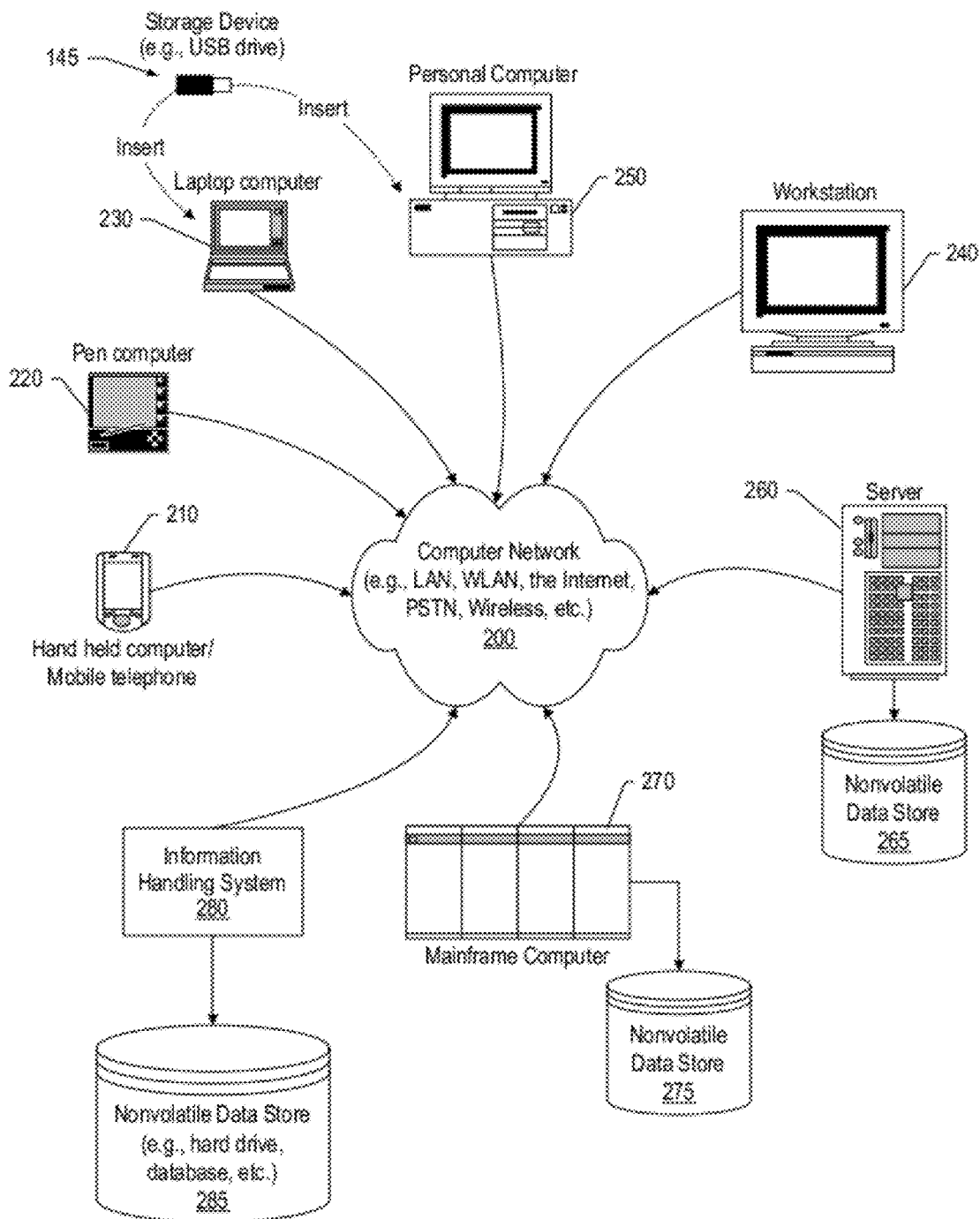
FIG. 2 is a network diagram of various types of data processing systems connected via a computer network.

FIG. 2 is a network diagram of various types of data processing systems connected via a computer network. FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
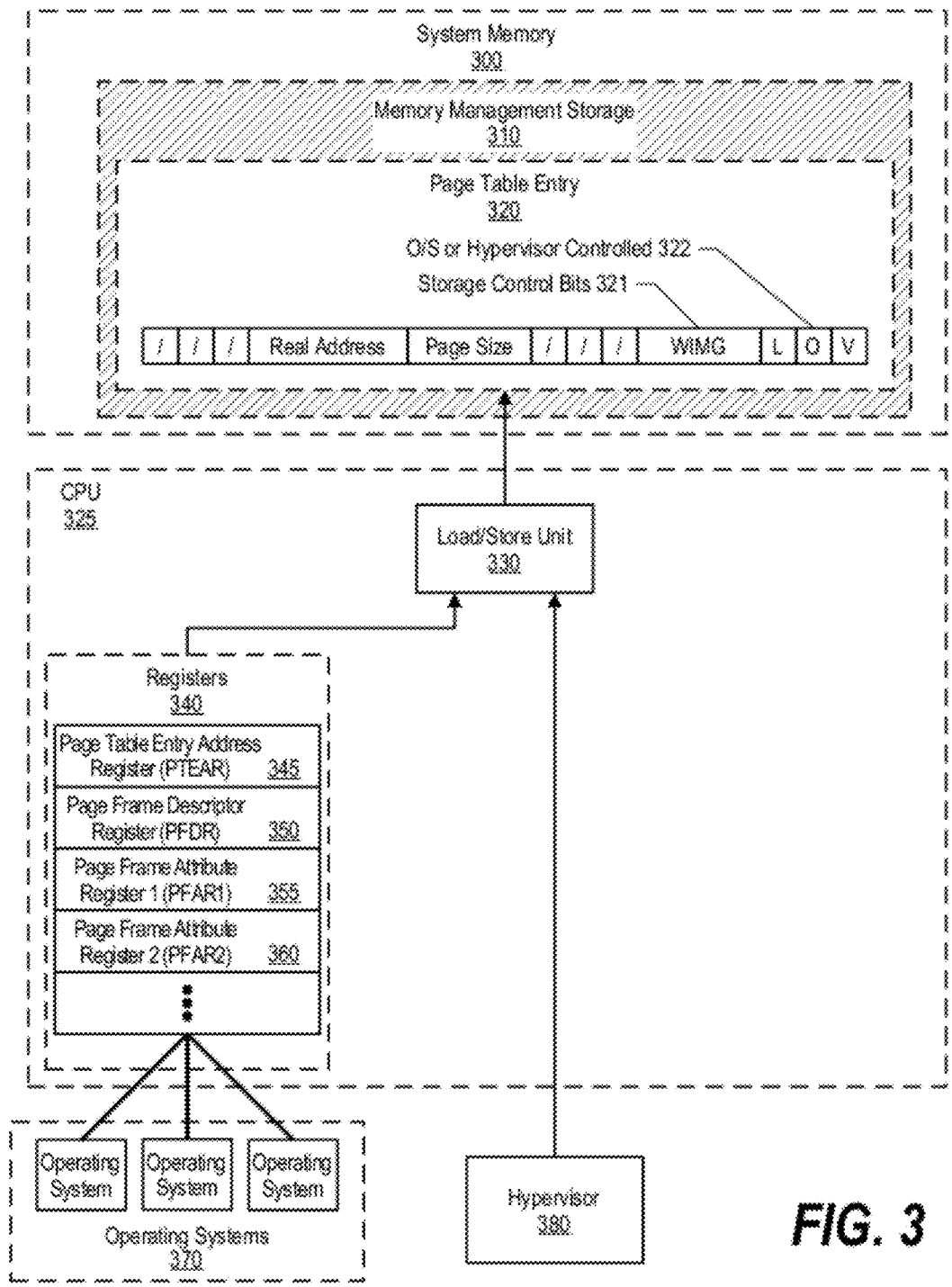
FIG. 3 is a block diagram depicting the hypervisor and operating systems interaction with CPU components in order to manipulate memory management storage.

FIG. 3 is a block diagram depicting the hypervisor and operating systems interaction with CPU components in order to manipulate memory management storage. System memory 300 includes Memory Management Storage 310 that further include Page Table Entries (PTEs) 320 as well as eXtension Pointers (XPs). In storage constrained and highly dynamic computing environments, page table manipulations can be frequent enough that the hypervisor call (hcall) overhead causes performance degradation. This approach provides a technique and resources with which an operating system (370) can directly manipulate page table entries 320. In one embodiment, the page table structure includes of a hashed table. In one embodiment, the entry may be either a Page Table Entry (PTE) or an eXtension Pointer (XP), which points to a page containing 256 PTEs. The operating system may use a variety of data structures to track the allocation of storage, including the Page Table itself. Those structures which contain the real address reside in storage with a new storage attribute called Memory Management, which is used to protect the integrity of the Page Frame Descriptor (PFD). Each entry in Memory Management Storage (MMS) 310 is a quadword, with the Page Frame Descriptor, consisting of the real address, page size, and storage control bits 321 (WIMG) attribute information, located in fixed locations consistent with the Page Table Entry format.

In one embodiment, MMS 310 is accessed freely by hypervisor 380 through Load/Store Unit 330 of CPU 325, and is accessed via registers 340 using defined instructions by operating system running on the system. Values stored in registers 340 are processed by Load/Store Unit 330 to update PTE 320.

In one embodiment, the Memory Management attribute is identified by control bits 321 (WIMG)=0b1100. A second special WIMG combination (WIMG=0b1101) is used to identify XPs in the hashed page table. In one embodiment where the second special WIMG combination is used, the kernel storage is mapped by page tables that are under the control of the hypervisor. It is also possible to have range registers or some such technique to create MMS 310 without the use of page tables. In some embodiments, hypervisor 380 might need to "steal" pages (e.g., for additional memory needs, etc.). In addition, in some embodiments, it might be necessary to differentiate PTEs that are under hypervisor control from those which may be manipulated by the operating system. Control indicator 322, also referred to as "the O bit" indicates whether the PTE can be managed by the OS (e.g., O=1) or may be updated only by the hypervisor (e.g., O=0). To ensure proper use of the page frames, the base address and the page size are provided and manipulated in a way that does not allow the operating system to access storage outside the bounds defined by the page frame real address and page size. In one embodiment, the operating system can alter the address and size to address a smaller page within the page provided by the hypervisor. In one embodiment, the operating system is further restricted in that it may not change the WIMG attributes.

Four registers 340 are used to communicate PTE data. The Page Frame Descriptor Register (PFDR) 350 is the repository for the authorized Page Frame Descriptor (i.e. the page frame base address, the page size, the WIMG attributes, and the valid bit). Note that in one embodiment, access to Page Frame Descriptor Register (PFDR) 350 is privileged and can be accessed by the operating system using the LPTE and STPTE instructions discussed above. In one embodiment, manipulation of the PFDR by the operating system is possible as a monolithic set of data using the LPTE and STPTE instructions. In this embodiment, the operating system is not permitted to manipulate individual fields of the PFDR. In addition, when the PTE is stored using STPTE, the PTE will be a consistent integration, or merger, of the PFDR content with PFAR1 and PFAR2, rather than solely a reflection of what is in the PFDR. In a further embodiment, for some system security implementations, it may be desirable to inhibit the operating system from reading the real address portion of the PFDR as this information may be considered secure. Page Frame Attribute Registers 1 and 2 (PFAR1 355, PFAR2 360) hold the other bits for a PTE. The Page Frame Attribute Registers also contain the bits that control page size, which may be programmed by the operating system, and identify a proper subset of the page specified in the PFDR. In this manner, in one embodiment, the operating system is able to make limited modifications to some of the fields that are included in the PFDR and one of either PFAR 1 or PFAR 2. For example, the operating system can change the L and LP values (the changed values go in PFAR1 and PFAR2, not PFDR) to specify a smaller page within the page it was originally given.

The Page Table Entry Address Register (PTEAR) 345 includes the effective address of the PTE to be updated and a valid bit that indicates the quadword is a PTE which the operating system may update. Page Table Entry Address Register (PTEAR) 345 is used to enforce the management state of a PTE when updating the PTE. In one embodiment, the PTEAR may only be loaded by using the LPTEAR instruction discussed below. The PTEAR includes the effective address of the PTE and a valid bit that indicates that the entry is a PTE (as opposed to an eXtension Pointer) and that the PTE is not in a hypervisor management state.

Four instructions are used to manage page table entries. These four instructions are hardware instructions executed by Load/Store Unit 330 of Central Processing Unit (CPU) 325. The instruction are as follows: First, Load Page Table Entry (LPTE) is an instruction that tests for the memory management attribute and that the PTE may be updated by the OS, and also the absence of the WIMG combination that indicates an eXtension Pointer as part of the load of the PFDR and PFARs (resetting the valid bit if the conditions are not met). Second, Store Page Table Entry (STPTE) is an instruction that stores the merge of the PFDR and the PFARs to a location in storage if the target quadword is not an eXtension Pointer and is not being managed by the hypervisor. As part of the merge operation, the STPTE instruction verifies that the L/LP bits supplied in the PFARs are consistent with those in the PFDR. As known by those skilled in the art, in one embodiment, the L/LP bits indicate the page size and, in some cases, the alignment of the page in storage. Third, Load Page Table Entry Address Register (LPTEAR) is an instruction that loads the effective address of the target PTE and checks to ensure that the quadword is not an eXtension Pointer and that the hypervisor is not managing the entry, setting a valid bit accordingly. Fourth, Page Frame Descriptor Invalidate (PFDI) is an instruction that sets the valid bit in the PFDR to zero.

To write a new PTE, the operating system first loads the address into the PTEAR using the LPTEAR instruction. The operating system then loads an authorized Page Frame Descriptor in the format of a PTE into the PFDR and PFARs (with L/LP bits replicated into the appropriate bits of the PFARs) using the LPTE instruction. The operating system then modifies the contents of the PFARs using the MFSPR and MTSPR instructions to establish the appropriate page size, protection attributes, and so forth. Last, the operating system uses the STPTE instruction to merge and store the PTE.

In one embodiment, Memory Management Storage 310 includes two types of memory-management related structures: Page Table Entries (PTE) 320 and eXtension Pointers (XPs). General access to Memory Management Storage using In one embodiment, Load and Store instructions are limited to hypervisor state (hypervisor 380). Non-hypervisor privileged software (e.g., operating systems 370) may access Memory Management Storage via the Load Page Table Effective Address Register (LPTEAR), Load Page Table Entry (LPTE), Load Real Address (LRA), Store eXtension Pointer, and Store Page Table Entry instructions. In one embodiment, other attempts to access Memory Management Storage 310 by non-hypervisor privileged software is considered a storage protection violation.

As outlined above, this approach provides an operating system operating in a hypervised system with some limited ability to load and store data to the memory management storage. Accessing memory management storage via the registers and the instructions described above allows the operating system to access memory management storage while maintaining the integrity of the page table through the processes performed by the instructions.

Figure 4:
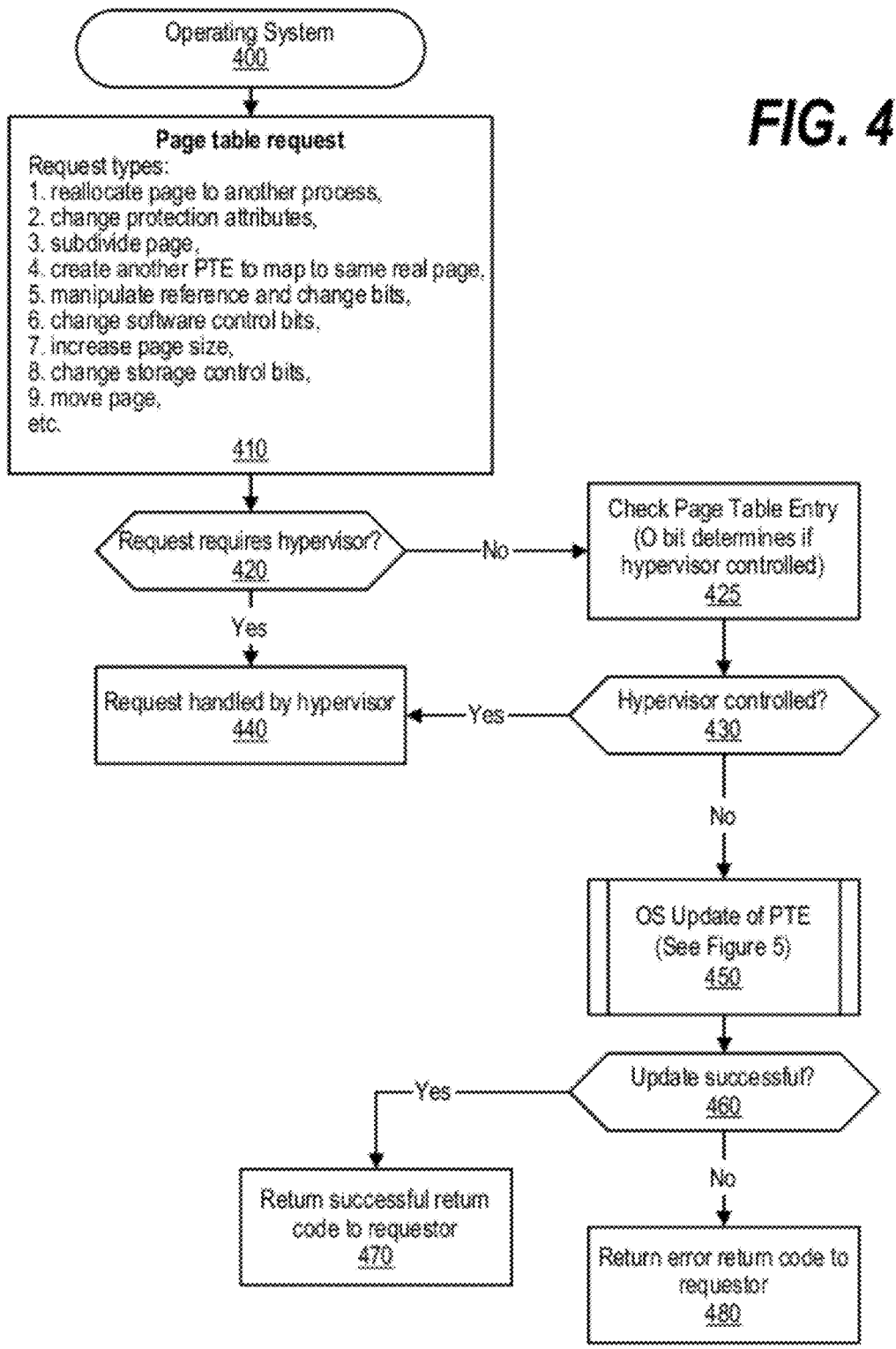
FIG. 4 is a first flowchart depicting steps taken by an operating system to handle an incoming page table request.

FIG. 4 is a first flowchart depicting steps taken by an operating system to handle an incoming page table request. Operating system processing is shown commencing at 400 whereupon, at step 410, a page table request is received. As shown, there can be many different request types including 1. reallocate page to another process, 2. change protection attributes, 3. subdivide page, 4. create another PTE to map to same real page, 5. manipulate reference and change bits, 6. change software control bits, 7. increase page size, 8. change storage control bits, 9. move page, and the like. Some of these pages may need the hypervisor to execute, while others may be performed by the operating system using registers 340 introduced in FIG. 3, and related text, above. Returning to FIG. 4, a decision is made as to whether the page table request received at the operating system requires the hypervisor (decision 420). For example, in one embodiment, the hypervisor is required to increase a page size, to change the storage control bits, and to move a page. If the received request does not require the hypervisor, then decision 420 branches to the "no" branch whereupon, at step 425, a control indicator is checked (e.g., control indicator "O bit" 322 shown in FIG. 3) in order to determine if the page table entry (e.g., PTE 320 shown in FIG. 3) is hypervisor or operating system controlled. For example, in one embodiment, if the control indicator is "1" then the PTE is operating system controlled, and if the control indicator is "0" then the PTE is hypervisor controlled.

A decision is made as to whether the PTE is hypervisor controlled (decision 430). If the request is hypervisor controlled, then decision 430 branches to the "yes" branch. If either the request requires the hypervisor (decision 420 branching to the "yes" branch) or the control indicator identifies the hypervisor as controlling the PTE (decision 430 branching to the "yes" branch), then the hypervisor handles the request at step 440. On the other hand, if the request does not require the hypervisor (decision 420 branching to the "no" branch) and the PTE is not hypervisor controlled (decision 430 branching to the "no" branch), then the operating system updates the PTE at predefined process 450 (see FIG. 5 and corresponding text for processing details). A decision is made as to whether the update performed by the operating system was successful (decision 460). If the update was successful, then decision 460 branches to the "yes" branch whereupon, at step 470, a successful return code is returned to the requestor indicating that the request was performed successfully. On the other hand, if the update attempted by the operating system was not successful, then decision 460 branches to the "no" branch whereupon, at step 480, an error is returned to the requestor indicating that the page table request was not successful.

Figure 5:
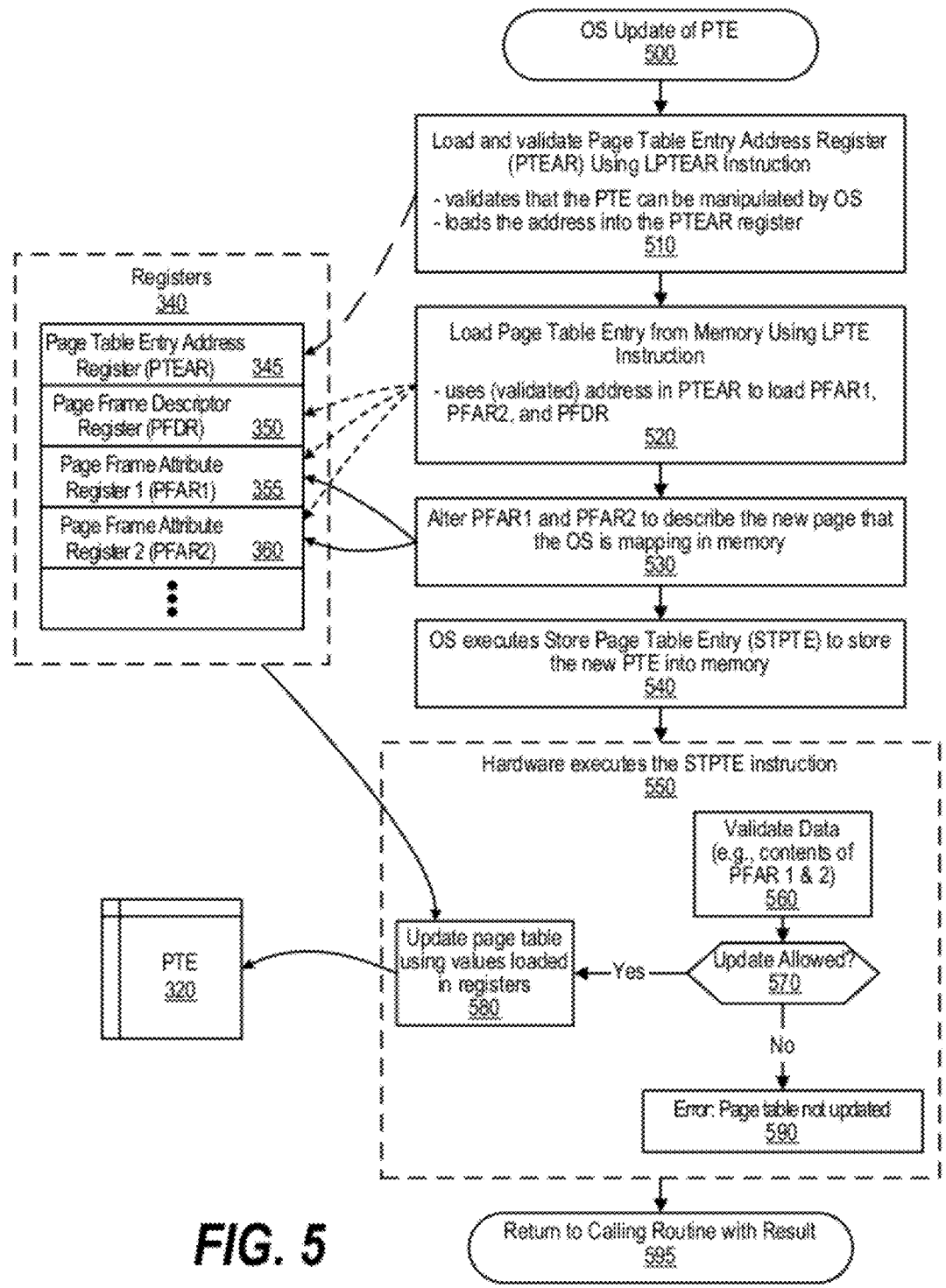
FIG. 5 is a second flowchart depicting actions taken by the operating system to update the page table entry.

FIG. 5 is a second flowchart depicting actions taken by the operating system to update the page table entry. This routine is called from predefined process 450 shown in FIG. 4. Processing commences at 500 whereupon, at step 510, the operating system loads the address of the PTE into PTEAR register 345 using the LPTEAR instruction. The LPTEAR instruction validates that the PTE can be manipulated by the operating system and also loads the address of the PTE into the PTEAR register. At step 520, the PTE data is loaded from memory into various registers (PFDR 350, PFAR1 355, and PFAR2 360) using the LPTE instruction. The LPTE instruction uses the (now validated) address that was loaded in the PTEAR register during step 510 to load data to the various registers. At step 530, the operating system alters the data stored in PFAR1 and 2 (registers 355 and 360) to describe the new page that the operating system is mapping in system memory. After the various registers are loaded and the contents are altered as needed, at step 540, the operating system executes the Store Page Table Entry (STPTE) hardware instruction to store the new PTE into Memory Management Storage (MMS).

Block 550 shows steps performed by the Load/Store Unit of the CPU to execute the STPTE instruction. First, at step 560, the Load/Store Unit validates data stored in the registers, such as the contents stored in PFAR1 and 2 which could have been altered by the operating system during step 530. A decision is made by the Load/Store Unit, based on the validation of the data, as to whether the update to the PTE is allowed (decision 570). If the update is allowed, then decision 570 branches to the "yes" branch whereupon, at step 580, the Load/Store Unit of the CPU updates PTE 320 using values loaded in registers 340. On the other hand, if the update is not allowed, then decision 570 branches to the "no" branch whereupon, at step 590, the Load/Store Unit causes an error to occur indicating that the PTE was not updated. After block 550 concludes, at 595, processing returns to the calling routine (see FIG. 4) with a result that indicates whether the update was allowed (performed).

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented in a hypervised computer system, the method comprising:

receiving a page table request at an operating system, wherein the operating system is one of one or more operating systems executing in the hypervised computer system that is being managed by a hypervisor;

identifying, by the operating system, a request type corresponding to the page table request;

determining, based upon the identified request type, whether the page table request requires the hypervisor to process;

handling the page table request by the hypervisor in response to the determination revealing that the page table request requires the hypervisor;

in response to determining that the page table request does not require the hypervisor:

reading a control indicator of a page table entry corresponding to the page table request; and executing one or more instructions by the operating system to update the page table entry in response to the control indicator identifying that the page table entry is controlled by the operating system.

2. The method of claim 1 wherein the control indicator is a control bit included in the page table entry.

3. The method of claim 1 wherein the executing of the one or more instructions further comprises:

loading, by the operating system, one or more hardware registers with data, the one or more hardware registers separate from the page table; and executing a store page hardware instruction, wherein the store page hardware instruction stores the data loaded into the one or more hardware registers into the page table entry.

4. The method of claim 3 further comprising:

loading a page table entry address register (PTEAR) with an address corresponding to the page table entry, the page table entry address register included in the one or more hardware registers; and validating that the page table entry is updatable by the operating system.

5. The method of claim 4 further comprising:

loading a page frame descriptor register (PFDR), and one or more page frame attribute registers (PFARs) with the data, the data pertaining to a new memory page being mapped by the operating system, wherein the page frame descriptor register and the one or more page from attribute registers are included in the one or more hardware registers.

6. The method of claim 4 further comprising:

attempting to load, by the operating system, the data from a first location to the page frame descriptor register (PFDR);

detecting that the first location is not marked with a memory management attribute;

in response to the detection:

inhibiting the attempt to load of the PFDR; and generating an error.

7. The method of claim 4 further comprising:

detecting an attempted load of a page frame descriptor register (PFDR) directly from another register, wherein the attempted load is performed by the operating system;

in response to the detection:

inhibiting the attempt to load of the PFDR; and generating an error.

8. The method of claim 5 further comprising:

after the loading of the one or more hardware registers, executing a store page table entry (STPTE) hardware instruction that stores the page table entry in a memory, wherein a processor executes the STPTE instruction by performing steps comprising:

determining if an update of the page table entry is allowed by validating data stored in the one or more hardware registers, wherein the validating also performs an integrity check of the page table entry based on values loaded in the one or more hardware registers;

updating the page table entry using one or more values stored in the one or more hardware registers in response to the determination being that the update is allowed; and signaling an error in response to the determination being that the update is not allowed.

* * * * *